July 19, 1955 — I. L. STEPHENSON — 2,713,326

ANIMAL CHUTE

Filed Oct. 19, 1953 — 5 Sheets-Sheet 1

INVENTOR
Isaac L. Stephenson
BY
Roy J. Woodward
ATTORNEY

July 19, 1955　　I. L. STEPHENSON　　2,713,326
ANIMAL CHUTE
Filed Oct. 19, 1953　　5 Sheets-Sheet 2

INVENTOR
Isaac L. Stephenson
BY
ATTORNEY

July 19, 1955

I. L. STEPHENSON 2,713,326

ANIMAL CHUTE

Filed Oct. 19, 1953

INVENTOR

Isaac L. Stephenson

BY Ross J. Woodward

ATTORNEY

July 19, 1955  I. L. STEPHENSON  2,713,326
ANIMAL CHUTE
Filed Oct. 19, 1953  5 Sheets-Sheet 4
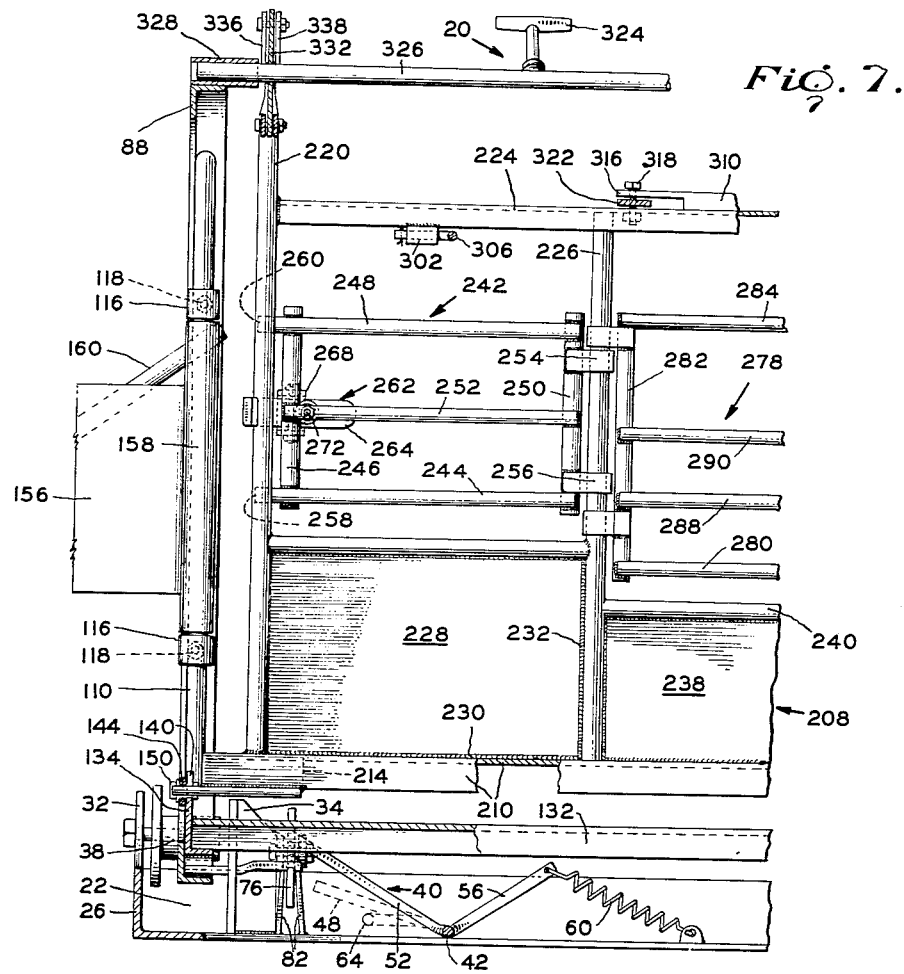
Fig. 7.
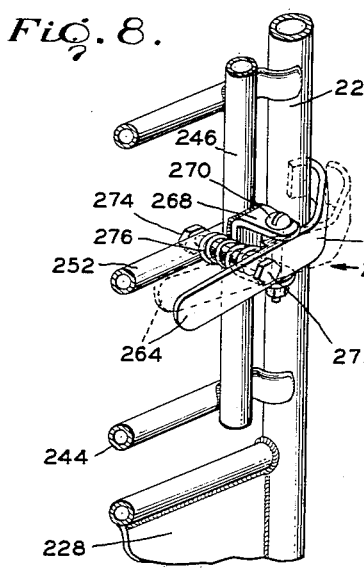
Fig. 8.
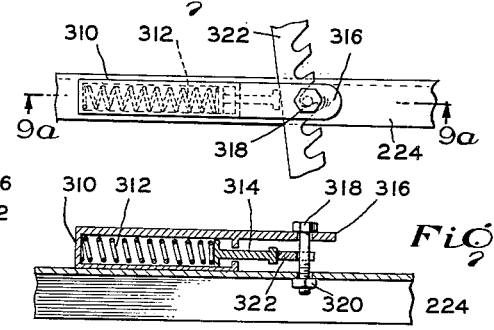
Fig. 9.
Fig. 9a
INVENTOR
Isaac L. Stephenson
BY *Ross J. Woodward*
ATTORNEY July 19, 1955  I. L. STEPHENSON  2,713,326
ANIMAL CHUTE
Filed Oct. 19, 1953  5 Sheets-Sheet 5
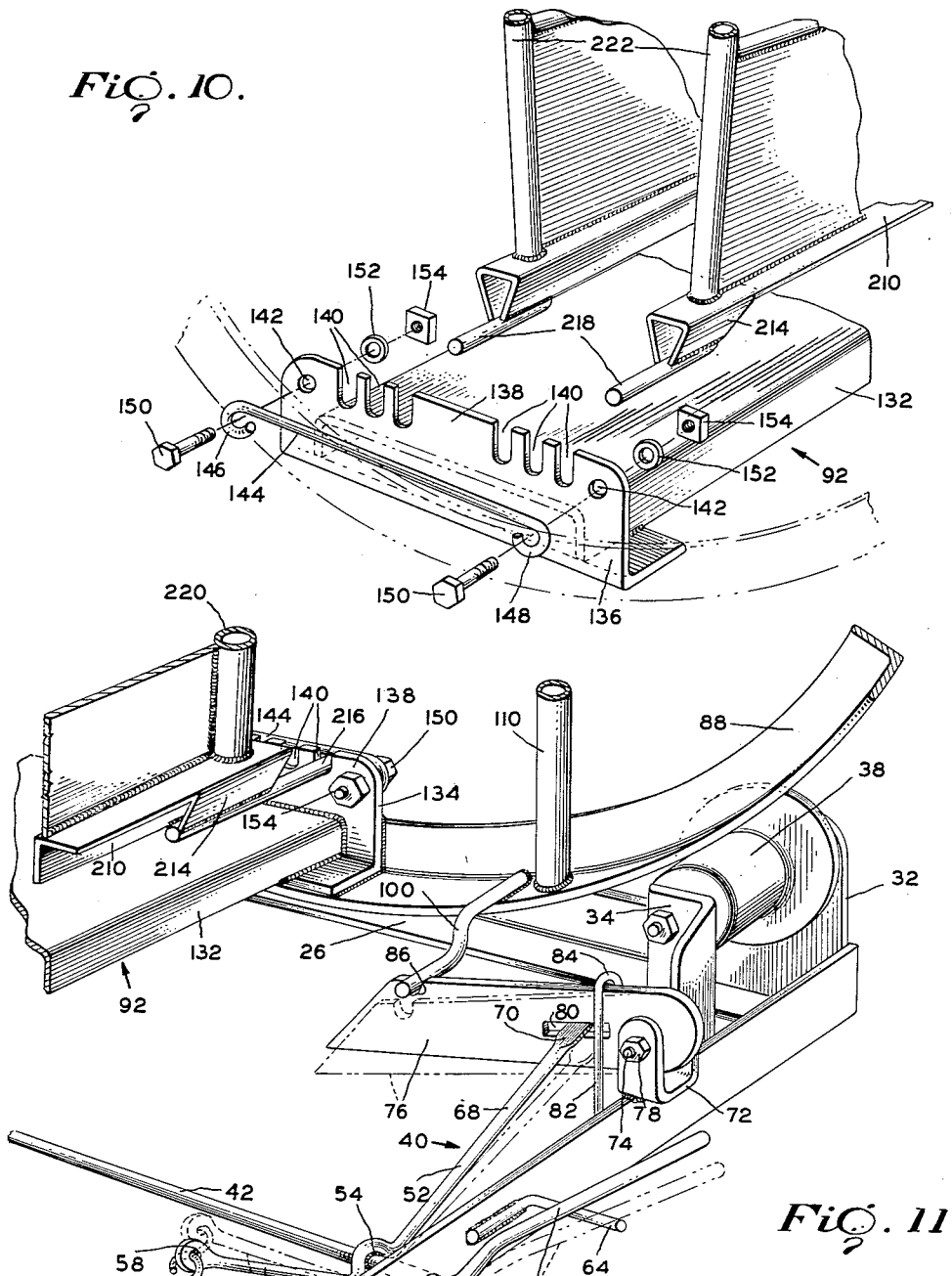
INVENTOR
*Isaac L. Stephenson*
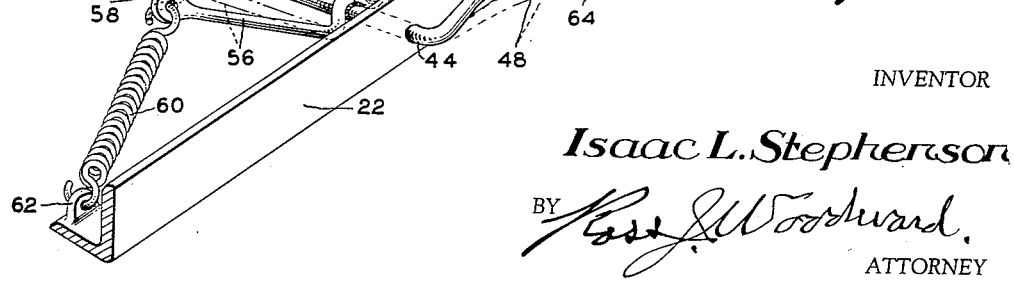
BY *Ross J. Woodward*
ATTORNEY United States Patent Office 2,713,326
Patented July 19, 1955

2,713,326

ANIMAL CHUTE

Isaac L. Stephenson, Darrouzett, Tex.; Basil Duke, administrator of said Isaac L. Stephenson, deceased, assignor to Fannie Stephenson, Darrouzett, Tex.; Basil Duke guardian of estate of said Fannie Stephenson Application October 19, 1953, Serial No. 386,821

6 Claims. (Cl. 119—99)

The present invention relates to improvements in animal chutes and more particularly to chutes for holding calves and the like for dehorning, branding, castration, doctoring or other necessary operations.

It is a primary object of the present invention to provide an improved calf holding chute which will provide for rapid and facile access to the calf in an angular position and to any of the four quarters or head of the animal.

Another object of the present invention is to provide an improved animal chute wherein the head of the animal can be effectively releasably held without chance of choking the animal.

Still another object of the present invention is to provide an improved means for squeezing the sides of the animal and wherein when the animal is held in position, any quarter of the animal can be exposed by pivoting to an open relationship the selected gate over the quarter of the animal.

A further object of the present invention is to provide an improved animal chute wherein the animal has its sides squeezed so as to be held from movement and wherein the squeezing action is positively manually effected by lever action with latch means holding the side panels in their squeezing relationship.

A still further object of the present invention is to provide an improved animal chute wherein there is adjustment between the bottoms of the pivotally mounted side squeezing gates so as to accommodate various sizes of animals.

Another object of the present invention is to provide an improved animal chute embodying rotatable means whereby the animal, restrained from movement, can be rotated to either side and wherein means is provided for holding the removable means in a selected rotated position.

Still another object of the present invention is to provide an improved animal chute wherein head restraining means is provided which includes a cable element which can be drawn taut about the animal's head and which embodies friction gripping means for resisting rotation of the animal's head.

Other objects of the present invention are to provide an improved animal chute which will be strong in construction yet light weight and easy to handle and which will firmly hold the animal while being rotated to any angular position.

Various other objects and advantages will become apparent from the detailed description to follow. The best form in which I contemplate applying my invention is illustrated in the accompanying drawings wherein:

Fig. 7 is a fragmentary vertical sectional view as seen on line 7—7 of Fig. 2 and showing one of the quarter access gates in open position in dotted lines;

Fig. 8 is a fragmentary perspective view of one of the side quarter access gate latches;

Fig. 9 is an enlarged fragmentary view of overhead locking of latching mechanism for firmly securing the side frame members in selected relationship;

Fig. 9a is a longitudinal sectional view taken along line 9a—9a of Fig. 9;

Fig. 10 is a fragmentary perspective exploded view of the adjustably mounted side frame pivotal supporting means; and Fig. 11 is an enlarged fragmentary view of rotating lock or latch mechanism mounted in the base supporting structure.

Figure 1:
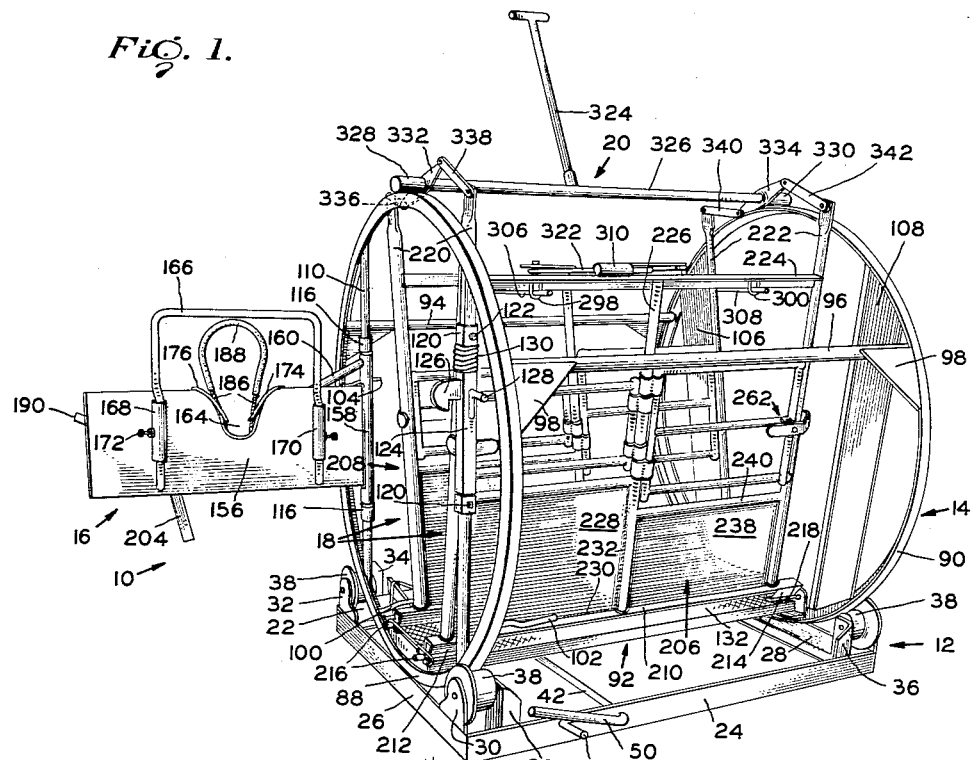
Fig. 1 is a general overall perspective view of the animal chute of the present invention showing the headgate in open position.

Referring more particularly to the drawing wherein like numerals designate like parts throughout, it will be seen that the animal chute 10 of the present invention is comprised of a base supporting means 12, a rotating framework 14, a swinging head gate means 16, adjustable side panel means 18 and a squeeze operating means 20.

As seen best in Figs. 1, 2, 10 and 11, the base supporting means 12 is comprised of a rectangular base including longitudinal angle irons 22, 24, joined in spaced parallelism by the transverse angle irons 26, 28. Secured to the transverse bars 26, 28 and upstanding therefrom are bearing flanges 30, 32 at the ends of each. A small vertically disposed angle iron is rigidly secured to each of the longitudinal bars 22, 24 adjacent the flanges 30, 32 as at 34, 36. Four flanged rollers 38 are journalled between the flanges 30, 32 and the small angle iron 34, 36 so as to provide roller supports at the four corners of the base.

Figure 6:
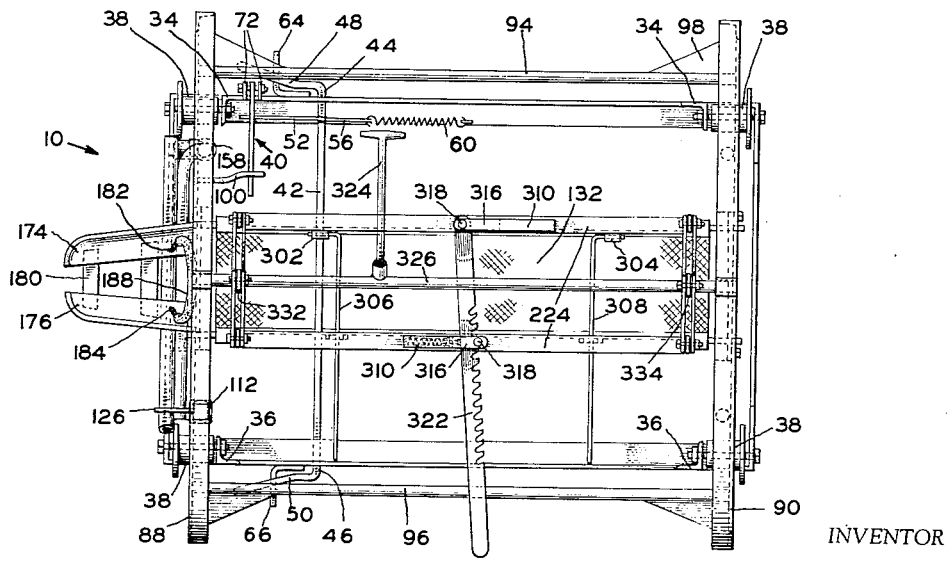
Fig. 6 is a top plan view showing the headgate closed and vertical side frames with their gates closed and the side frames in latched squeezing position.

As seen best in Figs. 6, 7 and 11, a latch mechanism 40 is mounted on the base supporting means 12, the purpose of the mechanism being set forth in detail hereinafter. The mechanism 40 includes a cross bar 42 which has end portions extending through the longitudinal angle irons 22 and 24, as at 44 and 46, and terminating in lever-like angularly extending portions 48 and 50. Inwardly of the mountings at 44, on the one side, the bar 42 has an angulated lever 52 welded thereto as at 54, one angularly extending end 56 of the lever terminating in an eye 58 to which a coil spring 60 is secured. The other end of spring 60 is secured to the eyelet 62 on the bar 22 so as to normally hold the lever 52 in the solid line position of Fig. 11.

On each of the bars 22, 24, a small right angled piece of rod 64, 66 is secured as by weld to provide a limit stop for the lever-like portions 48 and 50.

The other end 68 of the lever 52 inclines upwardly and terminates in a flattened end at 70. Adjacent the end 70 and on the bar 22 a U-shaped bracket 72 is secured, as by welding, and a bolt 74 extending through the bracket 72 pivotally supports the latch lever 76, nut 78 being threaded onto the bolt for securement thereof. The latch lever 76 has an opening therethrough at 80 through which the flattened portion 70 is engaged. A wire loop 82 is secured to the bar 22 and has the bend 84 over the latch lever at a point spaced from the pivot bolt 74 so as to limit the upward pivoting of the latch lever as urged by the spring 60. The latch lever 76 has a notch 86 in its upper edge for a purpose to be described.

Figure 4:
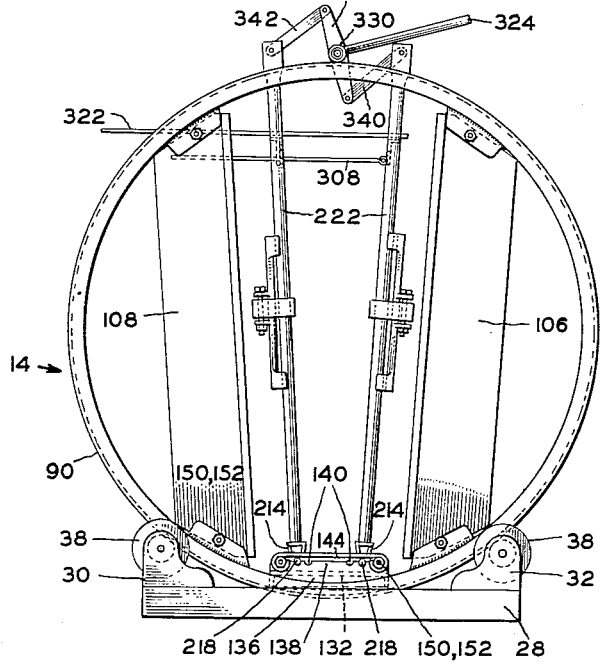
Fig. 4 is a rear elevational view.

The rotating framework 14 is comprised of a pair of circular angle irons 88, 90 engaged on the rollers 38 and joined by a base 92 and a pair of stiffening bars 94 and 96, the latter being secured at their ends to the circular angle irons with triangular gusset pieces 98 by welds. Three finger-like detents 100, 102 and 104 are secured to the circular angle iron 88 and extend substantially perpendicularly therefrom, and each of these detents is adapted to be engaged in the notch at 86 as shown in Fig. 11 so as to hold the rotatable framework in a vertical position as in Fig. 1, or in a side position as in Fig. 4, or in the opposing side position.

Figure 2:
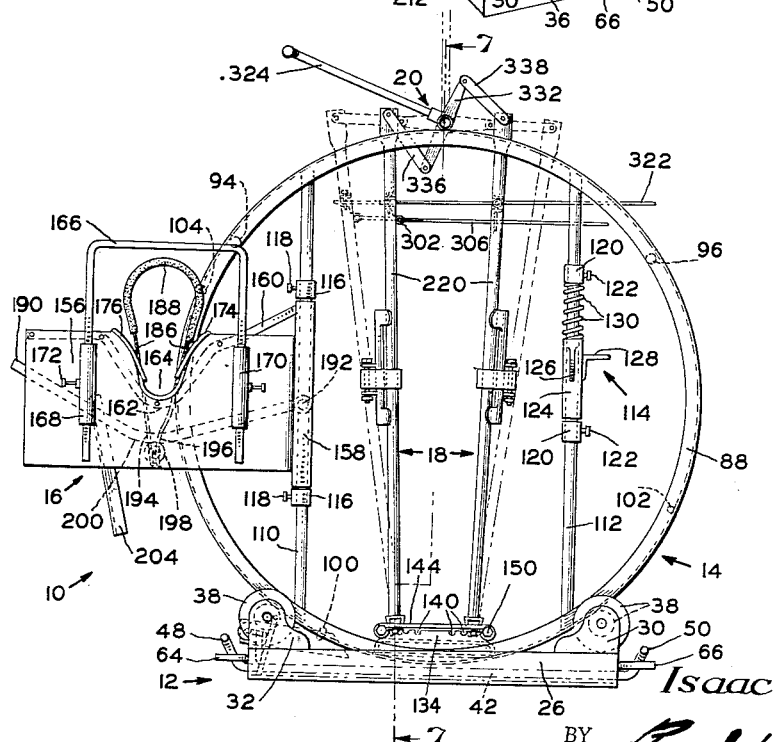
Fig. 2 is a front elevational view of the chute with the headgate open.

At the rear end of the chute, the circular angle iron 90 has a pair of angularly related flat stiffening members 106 and 108 secured thereto so as to provide a space therebetween through which the animal can pass. At the opposing end the element 88 has a pair of substantially parallel rods 110 and 112 joining circumferentially spaced points thereon, as shown in Figs. 1 and 2. The rod 110 is round in cross-section whereas the other rod 112 is square or of other polygonal cross-section. The circular cross-section of rod 110 is for pivotally receiving the head gate 16 thereon whereas the square or polygonal cross-section of rod 112 is for preventing pivoting of the latch means 114 mounted thereon. Small sleeve-like elements 116 provided with set screws 118 are adjustably fixed in spaced relation on rod 110 to adjust the height of the head gate, to be described. Similarly, sleeve-like elements 120 complementary to rod 112 are adjusted thereon and held in position by set screws 122.

The latch means 114 includes an elongated sleeve 124 slidable and non-rotatable on rod 112 and having a latch plate 126 fixed thereto. A finger bar 128 is also secured thereto for lifting the sleeve 124 and latch plate 126 to unlatching position. A spring 130 coiled around rod 112 urges the sleeve 124 to latching position.

The base 92 is comprised of an elongated inverted channel-shaped member 132 secured at its ends to a pair of angle brackets 134, 136 which in turn are welded or otherwise secured to the circular angle irons 88 and 90, as shown in Figs. 7, 10 and 11. Each of the angle brackets 134 and 136 has its upstanding portion 138 provided with a plurality of notches 140 and a pair of openings 142 outwardly of the notches. A wire retained element 144, provided with looped ends 146, 148 cooperates with the upstanding portions of the flange 138 by means of the bolt 150, washer 152 and nut 154 to enclose the notches for a purpose to be described.

Figure 3:
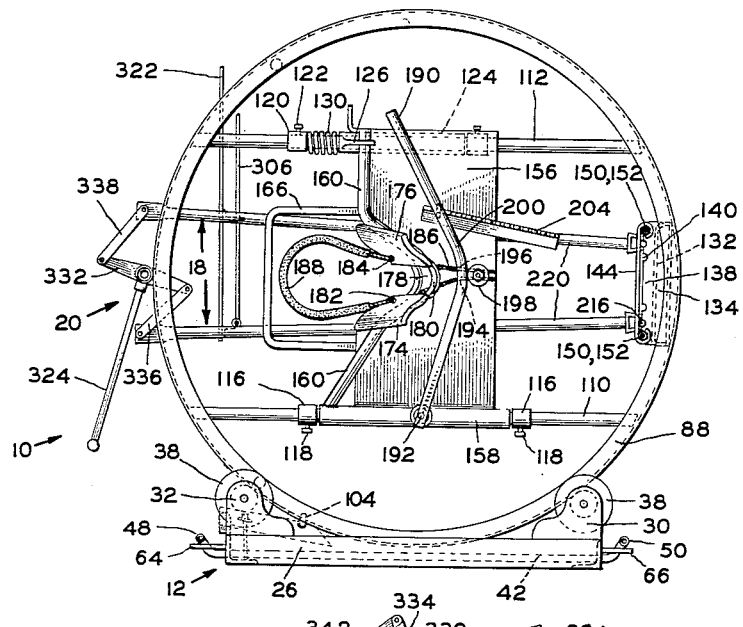
Fig. 3 is a front elevational view of the chute with the headgate in closed position and the unit rotated 90° on its side.

As shown best in Figs. 1 to 3, the head gate is comprised of a substantially rectangular flat metallic plate 156 to one end edge of which is secured an elongated sleeve 158 which is slidable and pivoted on rod 110 between the retaining sleeves 116. A stiffening bar 160 is welded along its length to the plate 156 and has a dip at 162 corresponding to the cut-away portion at 164 in the plate. An inverted U-shaped bar 166 is adjustably and slidably engaged through sleeves 168 and 170 which in turn are secured to the back side of the plate 156, set screws 172 being employed for securing the bar 166 in desired vertical adjustment.

Adjacent the cut-away portion at 164 a pair of head supporting plates 174 and 176 are secured and extend substantially perpendicularly from the plate 156 but with a slight downward incline. The plates 174 and 176 are angularly disposed relative to one another so as to provide a trough-shaped arrangement open at 178, the outer ends of plates 174 and 176 being connected by joinder piece 180, as shown in Fig. 3. The plates 174 and 176 both have an opening therethrough as at 182 and 184 through which passes a head-encircling cable 186, as of flexible steel, having a rubber-like covering 188 which when tightly drawn against the head of the animal will hold it securely against the head supporting plates and resist rotation or other movement of the animal's head.

Figure 5:
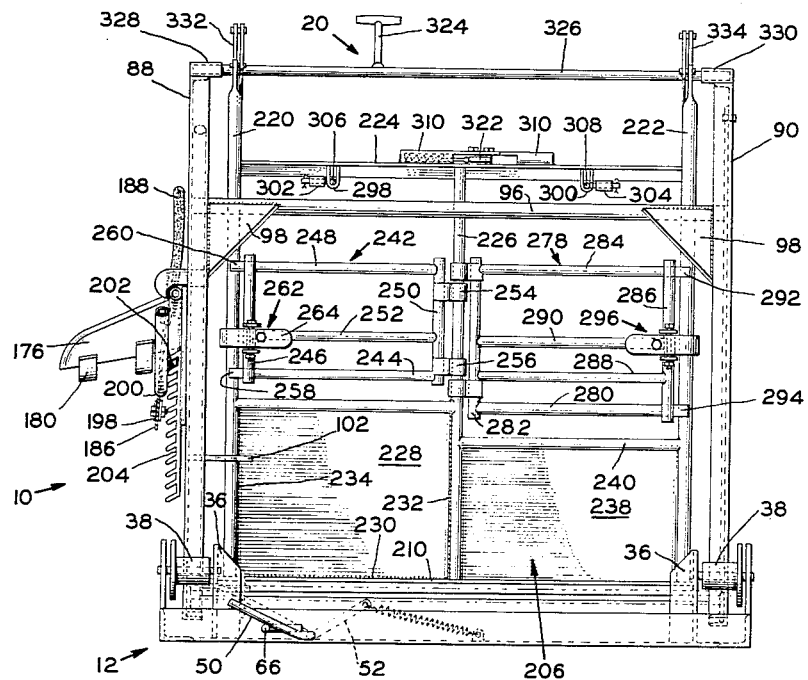
Fig. 5 is a side elevational view.

A long curved operating lever 190 is pivoted to the head gate plate 156 and sleeve 158 at 192 and has a pair of openings at 194, 196 through which ends of the cable 186 pass. The cable ends are joined therebelow by the connector 198. Intermediate the bend 200 and its free end, the lever 190 has a detent 202 secured thereto, see Fig. 5, for engagement in a selected notch of the latch plate 204 which is carried by the plate 156. The lever 190 has sufficient flexibility to permit bending to disengage the detent from the notches when it is desired to relieve the tautness of the head-encircling cable.

The side panel means 18 includes a pair of side frames 206 and 208 which are of similar construction and each of which has a plurality of openings that normally are closed by gates. A description of one side frame 206 will suffice. Looking at Figures 1, 4, 5, 10 and 11, it will be seen that side frame 206 is comprised of a bottom angle iron 210 to the end portions of which a pair of plates 212, 214 are welded so as to give a triangular section. At the bottom apex of the triangular sections, pins 216 and 218 are welded and extend outwardly for engagement in selected openings of the notches 140 whereat they are secured as above described. The side frame further includes a pair of parallel upstanding posts 220 and 222 which have their lower ends welded to the angle iron 210. Upper portions of the posts are joined by another angle iron 224 and a medium post 226 connects the angle irons and is parallel to posts 220 and 222. At the forward portion of the side frame, an imperforate plate 228 is welded as at 230, 232, and 234, a bar 236 being welded along its upper edge. A similar but smaller plate 238 is similarly welded at the rear portion of the side frame with a bar 240 along its upper edge, the latter plate being smaller than the forward plate to provide necessary access to the animal's rear quarters.

A forward quarter gate 242 includes rods 244, 246, 248 and 250 joined into a rectangle with another rod 252 medially of rods 244 and 248. A pair of mounting sleeves 254 and 256 pivotally support the gate 242 on post 226. The ends 258 and 260 of rods 244 and 248 are extended for abutting contact with post 220. A latch means 262 carried by side gate 242 is best shown in Fig. 8 as including a lever 264 terminating in an arcuate portion 266 adapted to be engaged about the post 220. A U-shaped bracket 268 is welded to rod 246 and pivotally supports the lever 264 by bolt 270. A bolt 272 extends through the lever 264 and rod 252 and has a nut 274 threaded thereon, a spring 276 being engaged between the lever 264 and rod 252 on the bolt shank to normally urge the arcuate portion 266 to latching position about the post 220.

Rear quarter gate 278 is similar to gate 242 but somewhat larger, and includes rods 280, 282, 284 and 286 forming a rectangle and additional rods 288 and 290 joining the rods 282 and 286. The rods 280 and 284 have their ends flattened and extended at 292 and 294 for engagement with post 222. Latch 296 is identical with latch 262 above described.

As seen best in Figs. 1, 2, 5 and 6, the angle iron 224 at one side frame has depending loops 298 and 300 and on the opposing angle iron sleeves 302 and 304 are secured by welds. Parallel cross bars 306 and 308 have angularly bent end portions pivotally received in the sleeves 302 and 304 and retained from withdrawal therefrom while the main portions of the bars are slidable through the loops 298 and 300 as the side frames are swung toward and from each other.

On top of the angle irons 224, as best seen in Figs. 7, 9 and 9a, latch means is provided for retaining the side frames in squeezing relation to the animal. On each of the angle irons 224 a tube 310 is secured. One of the tubes has a spring 312 therein and a plunger 314 extending therefrom. The tubes both have apertured extensions as at 316 through which a bolt 318 is engaged for securement through an opening in the angle iron 224 by nut 320. The other tube 310 has no spring or plunger but a flat bar 322 is pivoted to its bolt 318 and extends between the bolt 318 and plunger 314 of the other tube 310. The bar has a serrated edge for cooperation with the bolt 318 of the last mentioned tube to retain the side frames in adjusted relationship. It will be noted that the bar 322 is above the bars 306 and 308 so that the animal cannot accidentally dislodge the latch.

The squeeze operating means 20 (see Figs. 1 to 5) is comprised of a hand operated lever 324 which is fixedly secured to a shaft or operating rod 326 which in turn is rotatably carried in bearing sleeves 328 and 330 secured to aligned points on the circular angle irons 88 and 90. Double ended levers 332 and 334 are fixedly secured one to each end portion of shaft 326, and pairs of links 336, 338 and 340, 342 join the ends of the levers 332 and 334 with the upper ends of the posts 220 and 222 of the two side frames.

In operation, the calf or other animal is driven into the chute between the side frames as shown in dotted line position in Fig. 2. The calf's head is passed into the loop of the cable 186 and lever 190 is pushed downwardly to tightly hold the calf's head from any movement. At the same time lever 324 is swung to either side so as to draw the side frames into squeezing relationship, the latch bar 322 holding them in this relationship.

The whole rotatable assembly may then be rotated on the rollers to the position shown in Fig. 3 as for dehorning.

If it is desired to gain access to any quarter of the animal any one of the four gates can be opened without loosening the squeezing hold on the animal.

As above described the side frames can be adjusted relative to each other at the base to suit the size of the calf and the head gate can be raised or lowered as desired.

As this invention may be embodied in several forms without departing from the spirit or essential characteristics thereof, the present embodiment is intended as illustrative and not restrictive.

What is claimed is:

1. A rotatable chute for calves and the like comprising a pair of spaced circular track members adapted to be supported on suitable rollers, a floor panel interconnecting said track members, a pair of side members pivoted to said floor panel, and an elongated head gate associated with one of said circular track members, said head gate being pivoted at one side to said track member and separably latched to said track member at its other side, said head gate being provided along its top side with a head receiving notch, and a flexible cable member on said head gate adjacent said notch for holding a calf's head therein.

2. A rotatable chute for calves and the like as set forth in claim 1 wherein said head gate is provided with a trough-like portion adjacent said notch for supporting the head of the calf, and releasable means securing said flexible cable member in adjusted position with respect to said trough-like portion.

3. A rotatable chute for calves and the like as set forth in claim 2 wherein said trough-like portion comprises a pair of inclined substantially flat members separated at their bottom edges so as to avoid choking contact with the calf's neck.

4. A rotatable chute for calves and the like as set forth in claim 1 wherein the head gate is provided with a horizontal bar bridging the space at a sufficient distance above said notch to receive the head of a calf beneath said bar, said bar being adjustable vertically to suit calves of different heights.

5. A rotatable chute for calves and the like comprising a bottom panel for supporting a calf, head gate means for securely holding the head of the calf, side squeeze means connected with said bottom panel and relatively movable toward and away from one another for adjustable squeezing contact with the sides of the calf for substantially holding the same from movement, means rotatably supporting the bottom panel, the head gate means and side squeeze means so that the calf can be rotated to have either side up for dehorning or other purposes, said last recited means comprising a pair of circular endless track members disposed in spaced parallelism with their centers in axial alinement and fixedly joined by said bottom panel and at least one stiffening rod, a base and roller means on said base engaging the periphery of and supporting the circular track members, a pivot rod and a gate stop rod spaced apart and each joining circumferentially spaced points of one of said circular track members, said head gate means comprising a gate pivotally supported on said pivot rod for closing against said stop rod and having a trough-like portion shaped to engage and support the head and neck of the calf, head-encircling means adjustable relative to said trough-like portion for receiving the head of the calf therethrough, and releasable means fixing the adjusted relationship between the head-encircling means and said trough-like portion.

6. A rotatable chute for calves and the like as set forth in claim 5 having adjustment means for varying the relationship between the gate and said pivot rod whereby the distance between the platform and said trough-like portion is adjustable to suit calves of different sizes.

References Cited in the file of this patent

UNITED STATES PATENTS

| | | |
|---|---|---|
| 935,965 | Crossley | Oct. 5, 1909 |
| 939,228 | Dobry | Nov. 9, 1909 |
| 1,487,977 | Ryan | Mar. 25, 1924 |
| 2,678,631 | Hagar | May 18, 1954 |